United States Patent [19]

Molo

[11] Patent Number: 5,363,978
[45] Date of Patent: Nov. 15, 1994

[54] SEAL WITH VENT
[75] Inventor: Nicholas J. Molo, Kissimmee, Fla.
[73] Assignee: Dart Industries Inc., Deerfield, Ill.
[21] Appl. No.: 86,561
[22] Filed: Jul. 9, 1993
[51] Int. Cl.⁵ .............................................. B65D 51/18
[52] U.S. Cl. ..................... 220/254; 220/306; 220/307; 220/338; 220/367
[58] Field of Search ................. 215/235, 237, 306; 220/254, 306, 307, 338, 339, 367, 368, 373, 375, DIG. 19

[56] References Cited
U.S. PATENT DOCUMENTS

| D. 174,793 | 5/1955 | Bliss . | |
|---|---|---|---|
| D. 180,049 | 4/1957 | Tupper . | |
| D. 199,505 | 11/1964 | Swett et al. . | |
| D. 312,552 | 12/1990 | Carlson . | |
| 2,882,947 | 4/1959 | Close | 220/254 |
| 3,187,964 | 6/1965 | Foster . | |
| 3,255,928 | 6/1966 | Foster | 215/237 X |
| 3,307,602 | 3/1967 | Boster | 220/254 X |
| 4,595,123 | 6/1986 | Libit . | |
| 4,735,334 | 4/1988 | Abbott . | |
| 4,736,858 | 4/1988 | Shastal . | |
| 5,052,575 | 10/1991 | Ravreby . | |
| 5,054,640 | 10/1991 | Tucker . | |
| 5,110,002 | 5/1992 | Tucker . | |

Primary Examiner—Allan N. Shoap
Assistant Examiner—Nova Stucker
Attorney, Agent, or Firm—John A. Doninger

[57] ABSTRACT

A vent assembly for the seal of a food container including a vent opening in the seal panel at least partially surrounded by an upperwardly opening recess with the vent opening and recess being below the plane of the upper face of the panel. A vent cover pivotally mounts to the seal and, when selectively closed over the vent hole, partially overlies the recess to allow for engagement of fingers with the cover in the recess for upwardly opening of the cover. The closed cover does not project above the plane of the top panel of the seal as to interrupt the planar nature thereof.

12 Claims, 3 Drawing Sheets

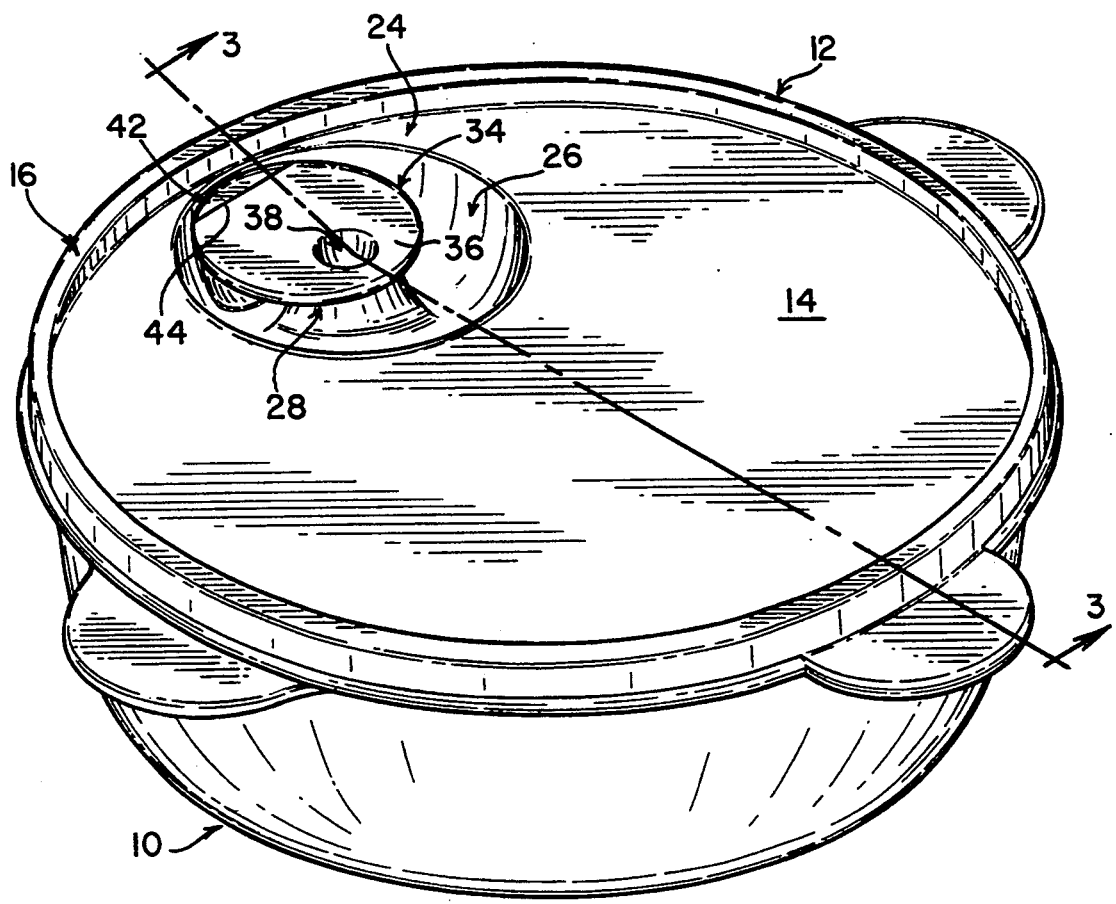
FIG_1
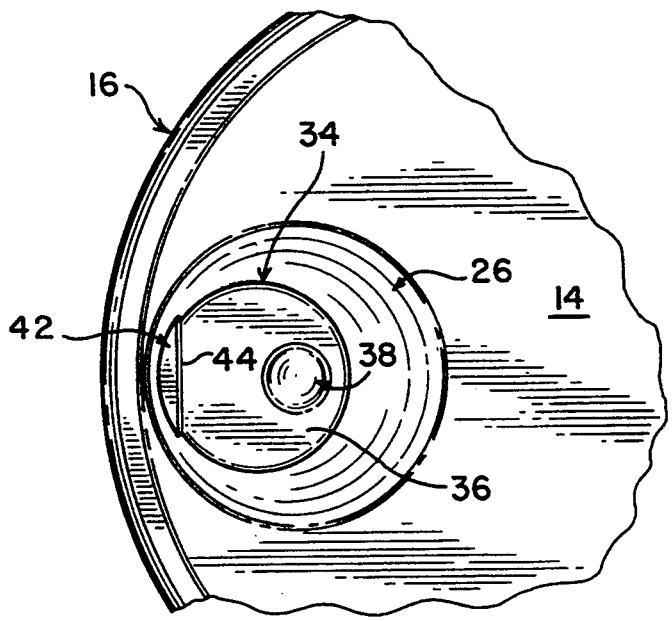
FIG_2

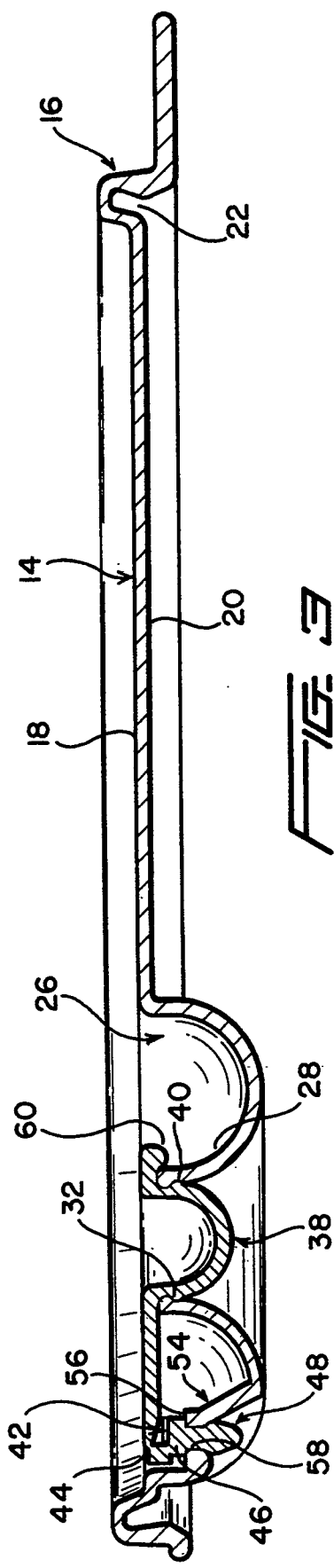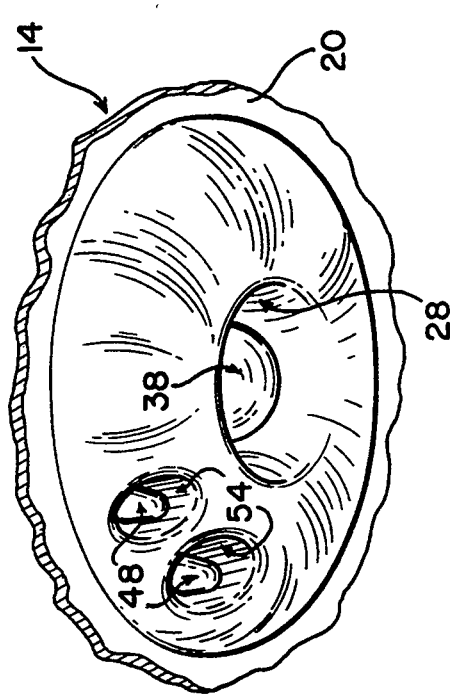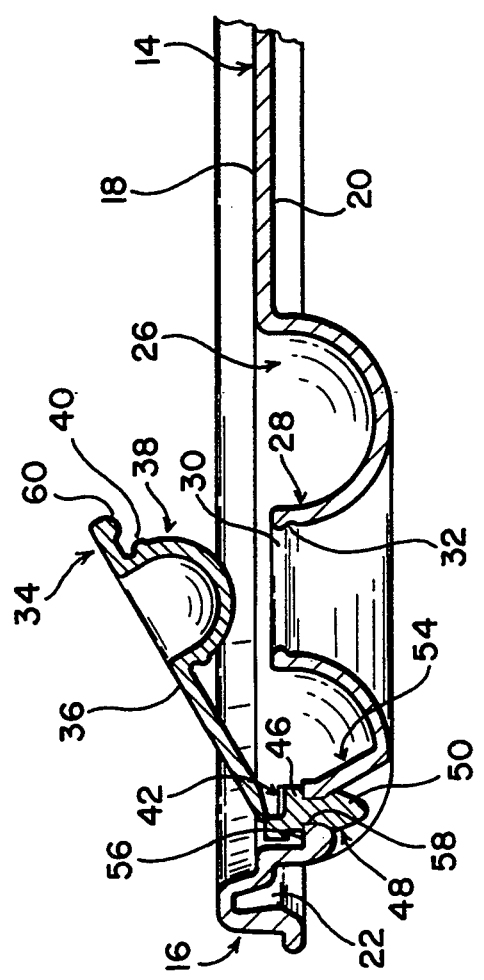

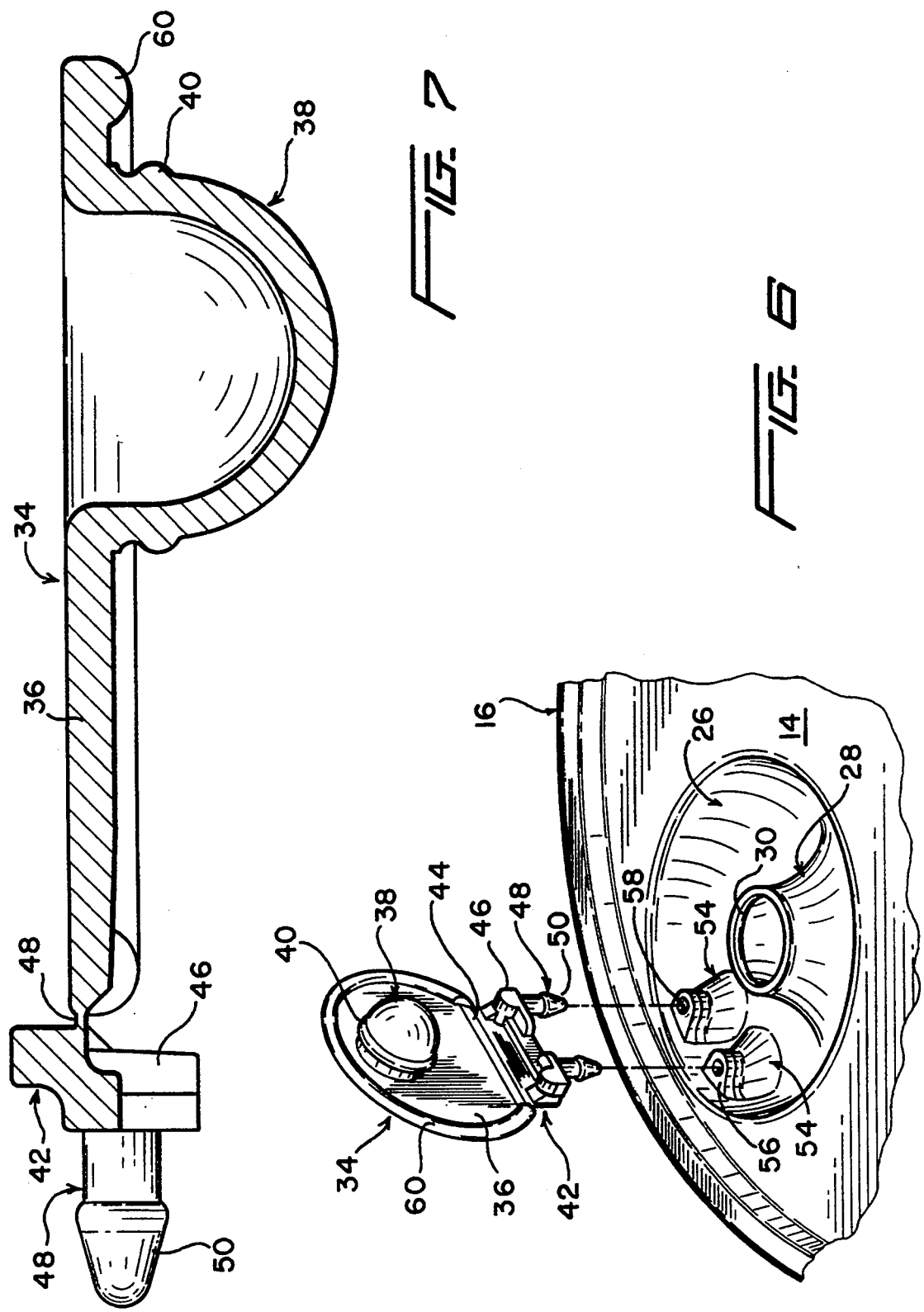

SEAL WITH VENT

BACKGROUND OF THE INVENTION

Food storage containers, conventionally of an appropriate plastic or synthetic resinous material such as polypropylene, are frequently also used as convenient containers for the heating or reheating of foodstuffs within a microwave oven. However, in order to accommodate the buildup of internal pressures during heating, the seal of the container must be removed or at least partially released. Complete removal of the seal is often not desirable because of potential spillage problems, an exposure of other goods within the oven to fumes emitted from the container stored goods, and the like.

Similarly, a partial opening of the seal, normally by an upward stripping of one section of the frictionally engaged edge flange, is inexact, particularly when dealing with round containers and seals, and could lead to an accidental release of the entire seal as a result of internal pressures.

SUMMARY OF THE INVENTION

The present invention comprises a seal for use with a storage and/or microwave heating container which incorporates a separate covered vent. The vent is selectively openable without disruption of the seal, that is without requiring partial release or removal of the seal.

The vent is integrally formed within the top panel of the seal and so oriented as to provide no projection or raised interruption in the planar upper face of the seal panel. This is of significance in that storage containers of the general type herein involved are conventionally stacked, one upon the other, thereby requiring substantially planar upper and lower stacking faces.

The vent cover, notwithstanding the flush positioning thereof when closed, is easily grasped and opened, even by the infirm or elderly. In addition, to facilitate cleaning, the cover, including the hinge assembly thereof, is removable from and remountable to the seal.

Structurally, the vent assembly is incorporated in the planar top panel of the seal, adjacent the peripheral flanged edge thereof. The vent assembly includes an annular depression in the seal panel inward relative to the outer or top face thereof and surrounding a central vent hole defined at the upper end of a truncated generally conical stem at a height slightly below the outer top face of the seal panel.

The vent cover is generally planar and includes an integral depending sealing plug selectively snap-locked within the vent opening for a sealing thereof. The cover, in the closed sealing position thereof, presents an upper surface substantially coplanar with the outer face of the seal panel, or sufficiently close thereto as to provide a flat stacking face.

The cover is integrally joined, by a living hinge, to an elongate mounting bar having a pair of depending headed lugs which snap-lock into sockets or hollow pedestals formed integral with a portion of the wall of the upwardly directed depression or recess. The cover, so mounted, will, upon manual manipulation, pivotally or hingedly move between open and close positions.

The cover projects beyond the sealing plug sufficient so as to extend slightly beyond the conical stem, the upper end of which defines the vent opening. This projecting portion slightly overlies the recess both forward and to the opposed sides of the cover, relative to the mounting bar. In this manner, and notwithstanding the planar relationship between the cover and the top panel of the seal, the cover can be easily grasped for manual manipulation. Basically, one need merely extend the fingers of one hand in the recess to underlie the projecting periphery of the cover and exert an upward pull thereon for a snap-disengagement. It is contemplated that the upwardly directed recess be such as to accommodate several fingers well below the cover, thus making manipulation of the cover easy for even the infirm. As an example, the finger accommodating portion of the annular recess, which will extend about a major portion of the cover other than for the hinged mounted portion thereof, can have an arcuate cross-section with a radius of approximately 1.085 cm drawn from a midpoint at or slightly below the lip portion of the vent opening. This in turn will result in a recess depth of approximately 1.085 cm, and a transverse recess width, at the upper portion thereof, of approximately 2.17 cm. These dimensions may vary, and are presented as representative to clearly illustrate that the recess is such as to accommodate a substantial tip portion of the manipulation fingers.

Other features and advantages of the invention will become apparent as the details of the invention are more fully hereinafter set forth.

BRIEF DESCRIPTIONS OF THE DRAWINGS

FIG. 1 is a perspective view of a storage container with the vented seal of the invention;

FIG. 2 is a partial top plan view illustrating the vent assembly portion of the seal;

FIG. 3 is an enlarged transverse cross-sectional view taken substantially on a plane passing along line 3—3 in FIG. 1 and illustrating the vent with the cover in its closed position;

FIG. 4 is a partial cross-sectional view similar to FIG. 3 and illustrating the vent open;

FIG. 5 is a bottom partial perspective view of the vent assembly seen from beneath the seal;

FIG. 6 is a top exploded perspective view of the components of the vent assembly; and FIG. 7 is an enlarged longitudinal cross-sectional view through the vent cover and mount therefor.

DESCRIPTION OF PREFERRED EMBODIMENT

Referring now more specifically to the drawings, FIG. 1 illustrates a storage container 10 with the vented seal 12 of the invention mounted thereon. Both of these units, including the various components of the seal 12 and vent, are of appropriate food-compatible and microwavable plastic or synthetic resinous material, for example high crystalline polypropylene.

The peripheral configuration of the seal 12 will be compatible to the shape of the mouth of the particular bowl 10 to which it is associate. For purposes of illustration, the seal 12 has been illustrated as circular, the bowl 10 being of a rather conventional rounded configuration.

The seal 12, as is generally conventional, includes a container-covering top panel 14 surrounded by an integral mounting flange 16. The panel 14 has an upper or outer face 18 which is preferably planar or substantially planar to allow for a stacking of multiple storage containers, and a similar planar or substantially planar under or inner face 20.

The peripheral mounting flange 16, preferably slightly upwardly offset from the upper face 18 of the panel 14, defines a downwardly directed groove 22 annularly about the seal 12 and adapted to releasably snap-lock to the upper rim of the bowl 10 in an obvious manner.

As the container is specifically intended for use in the heating or reheating of foodstuff in a microwave oven or the like, the seal 12, as a principal feature of the invention, is provided with a vent assembly 24. The vent assembly 24 comprises an upwardly opening annular depression or recess 26 formed in the panel 14 preferably adjacent the peripheral mounting flange 16. The recess is formed entirely below the planar upper or outer face 18 of the panel 14 and, in traverse cross-section, presents a substantially semicircular configuration. This in turn, as noted in FIG. 5, provides a generally toroidal appearance when viewed from the under face of the panel 14.

The annular recess 26 defines a central substantially conical upwardly directed hollow stem 28. The stem terminates in a truncated upper end defining a vent opening or hole 30 which provides for direct communication through the seal panel 14. The upper end of the stem 28, whereat the opening 30 is defined, is offset inwardly or below the plane of the upper face 18 of the panel 14 for reasons to be explained subsequently. Further, the inner surface of the upper end portion of the stem 28, about the defined opening, includes a slight peripheral undercut area or notch 32 therein.

In order to selectively close and seal the vent opening or hole 30, for example when a venting of the interior of the container is not necessary such as during use as a storage container, the vent assembly 24 is provided with a vent cover 34. The vent cover 34 comprises a generally circular panel 36 with an integrally formed depending or inwardly directed plug 38. The plug 38 is of a size for snug frictional reception within the vent opening 30 for an effective closing of the vent and a sealing of the vent assembly. In order to releasably secure the plug 38 within the opening 30, provision is made for a releasible snap-locking engagement by means of an annular integral bead 40 formed about the plug 38 in slightly spaced relation below the cover panel 36 for engagement within the notch 32 simultaneously with a seating of the cover panel 36 on the upper rim of the stem 28 about the opening 30, as best illustrated in the sectional detail of FIG. 3. With continued reference to FIG. 3, it will be appreciated that with the vent cover 34 closed, the upper surface of the cover panel 36 is substantially coplanar with the upper or outer face 18 of the seal panel 14, thus maintaining a planar stacking surface without any disruptive projection within the peripheral mounting flange 16. Basically, the thickness of the panel 36 of the cover 34 is equal or slightly less than the vertical spacing of the upper end of the vent stem 28 below the upper face 18 of the seal panel 14.

The cover panel 36 is, in the illustrated embodiment, substantially circular with the plug 38 positioned eccentric, that is in more closely spaced relation to one portion of the periphery or circumference. Diametrically opposed therefrom, and along a cord perpendicular to this diameter, the cover panel 36 is integrally joined to an elongate mounting bar 42 by a living hinge 44.

The mounting bar 42 includes a pair of spaced integral shoulder portions 46, each having an elongate projecting integral mounting lug 48 thereon. Each lug 48 is in turn formed with an enlarged tapered head or leading end 50.

In order to accommodate the mounting bar 42 and lugs 48, a pair of hollow upwardly opening pedestals 54 are integrally formed with and project radially inward from the peripheral wall of the recess 26 at a spacing corresponding to the spacing of the mounting bar lugs 48. These pedestals 54 define upwardly opening sockets with planar upper surfaces 56 surrounding the lug-receiving apertures 58.

Noting FIGS. 3 and 4 in particular, the lugs 48 engage through the corresponding pedestal openings 58 with the enlarged headed ends 50 thereof locking within the sockets as the mounting bar shoulders 46 seat on the respective upper surfaces of the respective pedestals 54. The inherent resiliency of the material of the pedestals and lugs, and the tapered configuration of the lug heads 50, allow for snap-mounting. Similarly, for cleaning or replacement purposes, the lugs, upon application of appropriate pressure, can be withdrawn. As illustrated, the pedestals 54 open downwardly or inwardly as a molding expedient. However, as desired, the pedestal sockets can be formed with closed inner ends.

The cover panel 36, forwardly from the opposed ends of the living hinge 44, projects sufficiently beyond the plug 38 as to partially overlay the recess 26 radially outward of the vent stem 28. The overlaying of the recess generally diametrically opposed from the living hinge 44 provides for a gripping lip, enhanced by a peripheral bead 60, sufficient as to allow for positive manual engagement by one or more fingers of a user for an upwardly opening of the cover 34. As will be appreciated from FIGS. 1 and 2 in particular, this peripheral extension of the cover panel 36 progressively increases rearwardly toward the living hinge. However, at least a major portion of the recess 26 forward of the living hinge 44 is readily accessible for at least one and possibly as much as four fingers, thus providing for positive engagement with the cover and substantial leverage to disengage the plug and upwardly pivot the cover to open the vent.

While the recess 26 has been defined as symmetrical about the central stem 28, interrupted only by the pedestals 54, obvious variations are also contemplated. For example, the centrally formed stem 28 can be offset closer toward the pedestals 54, thus in effect providing a relatively wider finger-accommodating recess area toward the forward side of the cover opposed from the hinge. Such a variation might also involve a more central positioning of the cover plug 38 on the cover panel 36.

Other possible variations of the preferred illustrated embodiment may include recesses of other than annular configuration. However, in each instance, the recess will extend peripherally along or about a substantial or major portion of the periphery of the cover and be of a width and depth sufficient to accommodate multiple fingers in underlying relation to the extending peripheral edge of the cover panel. In addition, in each variation the cover, in the closed position thereon, is to be substantially in or slightly below the plane of the top panel of the seal to maintain the planar stacking surface thereof.

The vent assembly of the invention provides a unique means for venting or providing a steam and pressure release for food containers when used in a microwave oven. In this manner, the versatility of a standard food container can be substantially enhanced, while at the same time retaining all of the desirable features of the conventional storage container, including a complete sealing thereof, an ability to stack the containers, and the retained ability to open and close the containers in the conventional manner.

The foregoing is illustrative of the features of the invention. As indicated, other embodiments incorporating such features may occur to those skilled in the art, and should be considered as within the scope of the invention more particularly defined in the claims following hereinafter.

I claim:

1. A vented seal for a container, said seal comprising a panel having an outer face and an inner face, a vent hole defined through said panel between said outer and inner faces, a portion of said panel laterally adjacent said hole being depressed inwardly relative to said outer face and defining an outwardly opening recess, a reclosable cover for said vent hole, means for releasably retaining said cover in a closed position overlaying and closing said hole, said cover being outwardly releasable from said closed position, said cover, in said closed position, extending laterally beyond said hole and partially overlaying said recess, said recess, beyond said cover, providing access to said cover inward thereof for manual engagement with and outward release of said cover, and said cover including an outer surface which, in said closed position, is in substantially a common plane with said outer face of said seal panel, means hingedly mounting said cover to said seal panel for pivotal movement toward and away from said closed position, said recess being substantially annular with said hole defined generally centrally thereof and at a level inward of said outer face of said seal panel.

2. The vented seal of claim 1 wherein said means hingedly mounting said cover comprises a hinge bar and a living hinge integrally joining said cover to said bar, said hinge bar including projecting lug means, said seal panel including outwardly opening socket means receiving and releasably snap-locking to said lug means.

3. The vented seal of claim 2 wherein said socket means is in said recess in inwardly spaced relation to said seal panel outer face, said socket means opening outward relative to said recess.

4. The vented seal of claim 3 wherein said cover, in said closed position, partially overlays said recess along at least a major portion of the length of said recess around said vent hole.

5. A vented seal for a container, said seal comprising a panel having an outer face and an inner face, a vent hole defined through said panel between said outer and inner faces, a portion of said panel laterally adjacent said hole being depressed inwardly relative to said outer face and defining an outwardly opening recess, a reclosable cover for said vent hole, means for releasably retaining said cover in a closed position overlaying and closing said hole, said cover being outwardly releasable from said closed position, said cover, in said closed position, extending laterally beyond said hole and partially overlaying said recess, said recess, beyond said cover, providing access to said cover inward thereof for manual engagement with and outward release of said cover, said recess being substantially annular with said hole defined generally centrally thereof and at a level inward of said outer face of said seal panel, said cover, in said closed position, partially overlying said access along at least a major portion of the extent of said recess around said vent hole, said cover including an outer surface which, in said closed position, is in substantially a common plane with said outer face of said seal panel.

6. A vented seal for a container, said seal comprising a panel having an outer face and an inner face, a vent hole defined through said panel between said outer and inner faces, a portion of said panel laterally adjacent said hole being depressed inwardly relative to said outer face and defining an outwardly opening recess, a reclosable cover for said vent hole, means for releasably retaining said cover in a closed position overlaying and closing said hole, said cover being outwardly releasable from said closed position, said cover, in said closed position, extending laterally beyond said hole and partially overlaying said recess, said recess, beyond said cover, providing access to said cover inward thereof for manual engagement with and outward release of said cover, said recess being substantially annular with said hole defined generally centrally thereof and at a level inward of said outer face of said seal panel, a hinge bar and a living hinge integrally joining said cover to said bar, said hinge bar including projecting lug means, said seal panel including outwardly opening socket means receiving and releasably snap-locking to said lug means.

7. The vented seal of claim 6 wherein said socket means is in said recess in inwardly spaced relation to said seal panel outer face, said socket means opening outward relative to said recess.

8. A vented seal for a container, said seal comprising a panel having an outer face and an inner face, a vent hole defined through said panel between said outer and inner faces, a portion of said panel laterally adjacent said hole being depressed inwardly relative to said outer face and defining an outwardly opening recess, a reclosable cover for said vent hole, means for releasably retaining said cover in a closed position overlaying and closing said hole, said cover being outwardly releasable from said closed position, said cover, in said closed position, extending laterally beyond said hole and partially overlaying said recess, said recess, beyond said cover, providing access to said cover inward thereof for manual engagement with and outward release of said cover, said recess being substantially annular with said hole defined generally centrally thereof and at a level inward of said outer face of said seal panel, and a central hollow stem defined from said seal panel by said substantially annular recess, said stem having an outer end inward of said outer face and defining said vent hole.

9. The vented seal of claim 8 wherein said recess is substantially semicircular in cross-section, and said stem is of a truncated substantially conical configuration.

10. The vented seal of claim 9 wherein said cover includes a cover panel overlaying said stem outer end in said closed position, said means for releasably retaining said cover in a closed position comprising a plug integral with and, in said closed position, projecting from said cover panel into frictional engagement within said vent hole.

11. A vented seal for a container, said seal comprising a panel having a periphery, an outer face and an inner face, a vent hole defined through said panel between said outer and inner faces and inward of said panel periphery, a portion of said panel laterally adjacent said hole being depressed inwardly relative to said outer face and defining an outwardly opening recess inward of said panel periphery, a reclosable cover for said vent hole, means for releasably retaining said cover in a closed position overlaying and closing said hole, said cover being outwardly releasable from said closed position, said cover, in said closed position, having a periphery laterally beyond said hole and partially overlaying said recess, said recess, beyond said cover, providing access to said cover inward thereof for manual engagement with and outward release of said cover, said cover including an outer surface which, in said closed position, is in substantially a common plane with said outer face of said seal panel, and means hingedly mounting said cover to said seal panel for pivotal movement toward and away from said closed position, said recess surrounding said hole and having an inner periphery adjacent said vent hole and an outer periphery outward of the inner periphery, said recess extending peripherally about at least a major portion of the periphery of said cover for providing said access to said cover about a substantial peripheral portion of said cover, said hole being at a level inward of said outer face of said seal panel.

12. The vented seal of claim 11 wherein said vent hole is defined generally centrally of said recess and defined by the inner periphery of said recess.

* * * * *